United States Patent [19]
Stucker et al.

[11] Patent Number: 5,870,663
[45] Date of Patent: Feb. 9, 1999

[54] MANUFACTURE AND USE OF $ZRB_2$/CU COMPOSITE ELECTRODES

[75] Inventors: Brent E. Stucker; Walter L. Bradley, both of College Station; Philip T. Eubank, Bryan; Bedri Bozkurt; Somchintana Norasetthekul, both of College Station, all of Tex.

[73] Assignee: The Texas A&M University System, College Station, Tex.

[21] Appl. No.: 691,410

[22] Filed: Aug. 2, 1996

[51] Int. Cl.⁶ .................................................... B22F 3/26
[52] U.S. Cl. .......................... 419/12; 419/27; 264/56; 264/60; 264/61; 264/63; 264/434; 264/497
[58] Field of Search ............................ 264/56, 60, 61, 264/63, 434, 497; 419/27, 12

[56] References Cited

U.S. PATENT DOCUMENTS

| | | | |
|---|---|---|---|
| 2,974,040 | 3/1961 | Fisher et al. | 75/202 |
| 3,258,817 | 7/1966 | Smiley | 22/202 |
| 3,929,476 | 12/1975 | Kirby, Jr. et al. | 75/214 |
| 4,327,156 | 4/1982 | Dillon et al. | 428/568 |
| 4,671,822 | 6/1987 | Hamashima et al. | 75/244 |
| 5,427,987 | 6/1995 | Mehrotra et al. | 501/96 |
| 5,632,941 | 5/1997 | Mehrotra et al. | 264/656 |

OTHER PUBLICATIONS

Gadalla, A.M. and Cheng, Y., "Machining of Zirconium Diboride and Its Composites", *Machining of Advanced Composites*, Editors R. Ramulu and R. Komanduri, ASME, New York, MD–vol. 45/PED–vol. 66, pp. 207–216, (1993).

*Primary Examiner*—Daniel J. Jenkins
*Attorney, Agent, or Firm*—Baker & Botts, L.L.P.

[57] ABSTRACT

The invention relates to $ZrB_2$/Cu composites, and more specifically to methods of making $ZrB_2$/Cu composite electrodes and methods of using $ZrB_2$/Cu composite electrodes. $ZrB_2$ powder is contacted with a polymer and shaped to a desired form. The polymer is vaporized and the $ZrB_2$ powder is sintered. The sintered $ZrB_2$ is contacted with Cu and heated above the melting point of Cu which causes the Cu to infiltrate the $ZrB_2$, forming the $ZrB_2$/Cu composite electrode.

65 Claims, 3 Drawing Sheets

MANUFACTURE AND USE OF ZRB$_2$/CU COMPOSITE ELECTRODES

This research was performed under a government grant, National Science Foundation Grant No. DMR-94203896, and under a National Science Foundation Graduate Research Fellowship, and the government may have some rights in this patent.

BACKGROUND OF THE INVENTION

1. Field of the Invention

This invention relates to the manufacture and use of zirconium diboride/copper (ZrB$_2$/Cu) composite electrodes. More specifically, the invention relates to a method of manufacturing ZrB$_2$/Cu composites which includes coating ZrB$_2$ powder with a polymer, utilizing rapid prototyping or cold pressing to shape or process the polymer coated powder to a desired form, sintering the shaped form to vaporize the polymer and sinter the ZrB$_2$ powder, and then infiltrating the sintered ZrB$_2$ with copper. The manufacturing technique provides ZrB$_2$/Cu composite electrodes with minimum electrode wear rates to be used in electrode applications where minimum wear is advantageous, including electrical discharge machining electrodes.

2. Description of the Related Art

ZrB$_2$ is a known intermetallic ceramic or cermet. However, due to its low thermal shock resistance and room temperature brittleness, ZrB$_2$ is rarely used for industrial purposes.

ZrB$_2$/Cu composites are known but rarely, if ever, used in industry because of the difficulty involved in fabricating the composite. Generally, its use has been limited to research purposes. The ZrB$_2$/Cu composite was investigated for possible use as a high-strength refractory coating for space ships subject to laser bombardment as well as for protection upon re-entry into the earth's atmosphere.

The only known way to make parts out of ZrB$_2$/Cu, particularly of complex and varying topographies, would be to hot press a mixture of ZrB$_2$ and Cu in a die that is the negative of the desired shape or to hot press a mixture and then machine it to the desired shape. Both of these processes involve significant shortcomings, including that they are very time and energy intensive and that the machining of a ZrB$_2$/Cu composite is known to be very difficult. Also, it is known that these techniques produce nonhomogeneous ZrB$_2$/Cu parts, leading to reduced performance of the parts.

SUMMARY OF THE INVENTION

There exists a need for ZrB$_2$/Cu composite electrodes which have minimum electrode wear rates and which are manufactured in a time and cost efficient manner and provide the dimensional accuracy and surface quality to make electrodes suitable for use as EDM electrodes.

The invention relates to a method of manufacturing ZrB$_2$/Cu composites comprising coating a ZrB$_2$ powder with a polymer and utilizing rapid prototyping or cold pressing to shape or process the polymer coated ZrB$_2$ powder into a desired form. The polymer coated ZrB$_2$ powder shaped form is sintered to vaporize the polymer and sinter the ZrB$_2$. The sintered ZrB$_2$ is then infiltrated with copper.

It is an object of this invention to manufacture ZrB$_2$/Cu composite electrodes, which have minimum electrode wear rates, in a time and cost effective manner, and in a manner which provides sufficient dimensional accuracy and surface quality so that the ZrB$_2$/Cu electrode can advantageously be used as an EDM electrode.

BRIEF DESCRIPTION OF THE DRAWINGS

A more complete understanding of the present invention and the advantages associated therewith may be acquired by referring to the accompanying drawings wherein.

DETAILED DESCRIPTION OF THE EXEMPLARY EMBODIMENTS

I. Forming ZrB$_2$/Cu Composite Electrodes

The electrode production path is generally a four step process. First, raw ZrB$_2$ powders are coated with a polymer coating which is optimized for use in an selective laser sintering (SLS) machine or other shaping step. Second, these polymer coated powders are preferably processed using SLS to "tack" together the ZrB$_2$ powders by sintering their respective polymer coatings, creating (shaping) a ZrB$_2$ part in the desired form—the underlying ZrB$_2$ is not thermally affected during this step. Third, a high-temperature furnace is used to both vaporize the polymer coating and sinter the ZrB$_2$ powder. Finally, the 30–70% dense network of zirconium diboride is infiltrated with an appropriate copper alloy.

A. ZrB$_2$ Powder Coated With Polymer

First, the appropriate size ZrB$_2$ powder must be obtained. Generally, ZrB$_2$ powder having a particle size of about 1 $\mu$m to about 10 $\mu$m, with an average of about 3 $\mu$m, is available and is suitable for cold pressing to shape the polymer coated ZrB$_2$ powder to desired forms as discussed below. However, for the selective laser sintering method as discussed below, generally a particle size of about 10 $\mu$m to about 100 $\mu$m is preferred. Suitable ZrB$_2$ powders may be obtained from Advanced Refractory Technology (ART) (Buffalo, N.Y.). Suitable polymer coated ZrB$_2$ powder, particularly for selectively laser sintering as discussed below, may be obtained from DTM Corp. (Austin, Tex.). Suitable polymer coated ZrB$_2$ powder for processing by methods other than selective laser sintering may be obtained from ART.

The coating of ZrB$_2$ powder with low T$_g$ polymer should be done in a way such that each particle is individually coated, e.g., fluidized bed, spray drying, etc., as is known to those of skill in the art. In coating the powder, consideration should be given to the production of the thinnest polymer coating possible consistent with coverage and good "tacking" together of the powder particles. The coating thickness also has an effect on shrinkage during laser sintering of the polymer coating to "tack" together the ZrB$_2$ particles and during sintering of the desired form which vaporizes the polymer coating and sinters the ZrB$_2$. A suitable low T$_g$ polymer, particularly for selective laser sintering, is the acrylic based binder available from DTM Corp. Suitable polymers for the other rapid prototyping techniques may be obtained from vendors of the rapid prototyping technique of interest.

For the "cold pressing" process of shaping the ZrB$_2$, as discussed below, the uniformity and thickness of the polymer coating is less critical as compared with the SLS process. Consequently, when cold pressing is used, less advanced techniques for coating the $ZrB_2$ powder may be employed. For cold pressing, suitable polymers include known pressing polymers, e.g., CERAMER 1608 (see Example 1).

B. Shaping $ZrB_2$/Polymer to Desired Form

Particularly where mass production of simple shaped electrodes is desired, "cold pressing" of $ZrB_2$ powder with a polymer binder is the preferred method of shaping $ZrB_2$/polymer to a desired form.

EXAMPLE 1

$ZrB_2$ powder was sent to ART Co. to be coated with a thin layer of polymer binder. The polymer binder, CERAMER 1608, was obtained from Petrolyte Corp. (St. Louis, Mo.). At ART Co., CERAMER 1608 was mixed with acetone to achieve a 25% by weight of the CERAMER 1608 binder in acetone. Three percent by weight of the CERAMER 1608 binder from the solution was then added to the $ZrB_2$ powder. This mixture was mixed using a stir bar while adding a small amount of acetone. After the acetone evaporated from the $ZrB_2$ mixture, the material was placed in a tumbler to break up the dried powder. The dried powder was then sieved through a 60 micron sieve to break the agglomerates.

The $ZrB_2$ coated with the polymer binder particles was then cold pressed at 10,000 psi in a square 1"×1" die to form a square electrode with a finished height of approximately 1.4". Lecithin mold release was used on the die to facilitate the removal of the rectangular electrode.

The rectangular electrode was then placed in the Thermal Technology Inc.'s (Santa Rosa, Calif.) GROUP 1000 graphite furnace. The furnace was then raised to about 600° C. for ½ hour to vaporize the polymer binder, and then subsequently heated to 1600° C. for one electrode and 1700° C. for another electrode for two hours to sinter the $ZrB_2$. Argon was used as an inert operating gas. This process resulted in an approximately 50% dense part. Next, a copper alloy powder (copper and about 3 wt. % boron) was added to the crucible and fired at 1200° C. for 2½ hours to infiltrate the copper via capillary action. This resulted in an approximately 100% dense part. Each composite was then cut and milled into four ⅜"×⅜" electrodes.

An AGIETRON 1U (Losone, Switzerland) die-sinking machine was used to compare the performance of the $ZrB_2$/Cu composite electrodes relative to copper and graphite electrodes at different on-times.

The materials were tested under a constant current of 24.8 A, off-time of 100 $\mu s$ and varying on-times ranging from 560–3.2 $\mu s$. The dielectric fluid used was British Petroleum cutting oil, Dielectric 200 EDM Fluid (petroleum based hydrocarbon, available from an EDM supplier), and flushing was achieved from the vertical movement of the electrode. The material removal rate was calculated as the volumetric removal rate divided by the total time.

Figure 1:
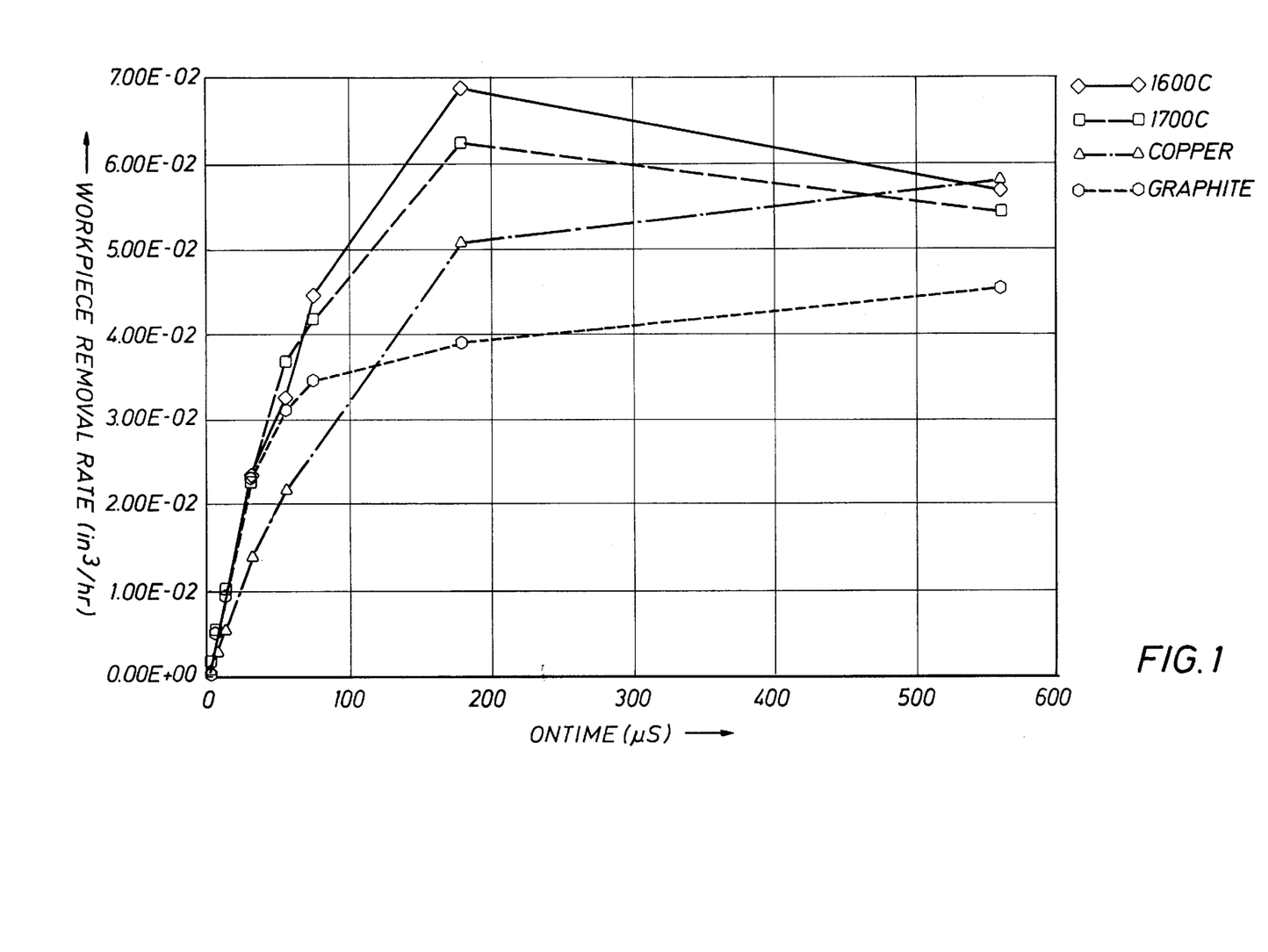
FIG. 1 is a graph showing workpiece removal rates for copper, graphite, and ZrB$_2$/Cu composite electrodes at different on-times.

The workpiece removal rates are shown in FIG. 1 for the copper, graphite, and $ZrB_2$/Cu electrodes at different on-times. FIG. 1 shows the superior workpiece removal rates of the $ZrB_2$/Cu composite electrodes as compared to copper and graphite. At 180 $\mu s$, the workpiece removal rates of the $ZrB_2$/Cu electrode is 1.7 times better than graphite and 1.3 times better than copper. The data shows that $ZrB_2$/Cu has a peak workpiece removal rate of about 5.71E-2 in$^3$/hr.

Figure 2:
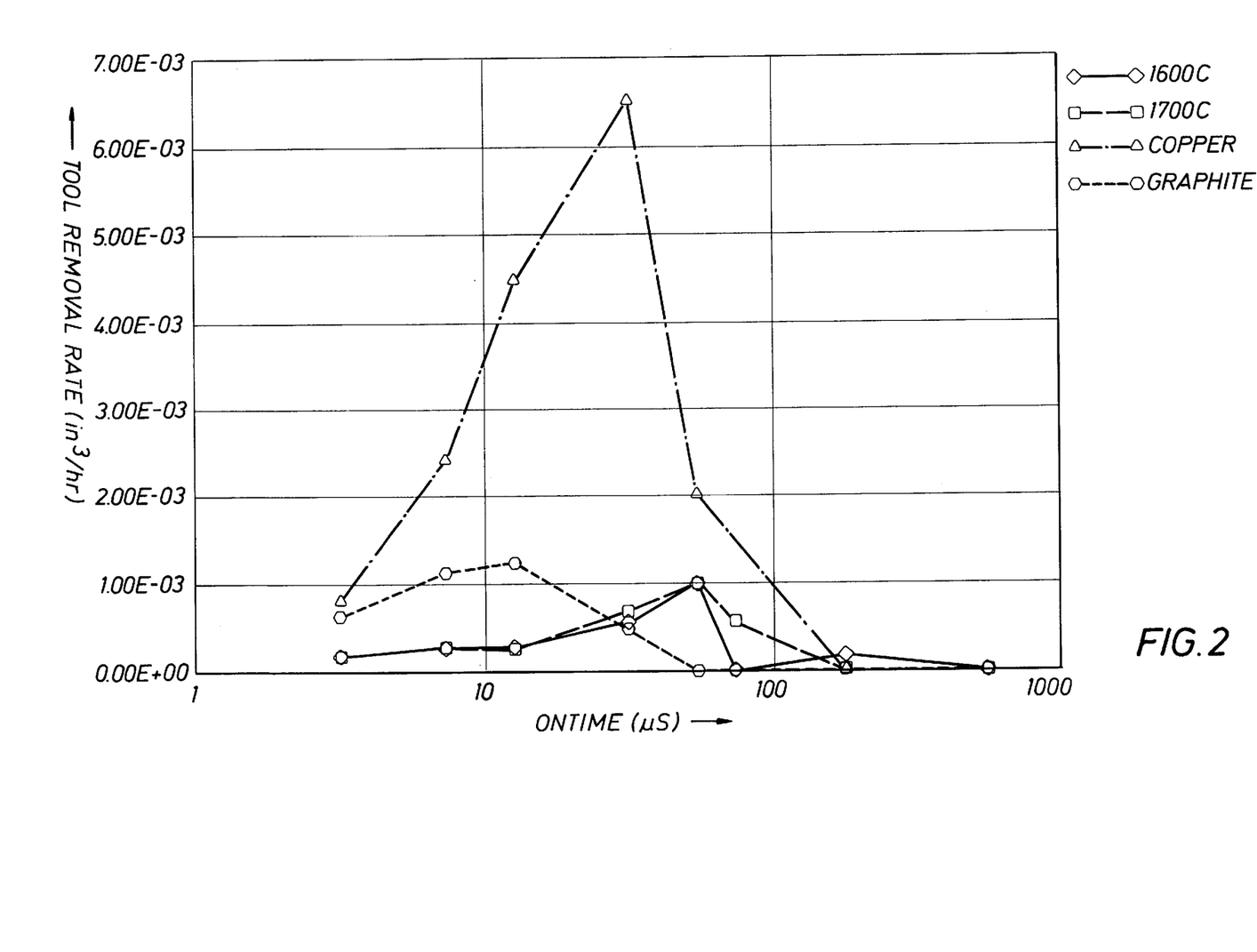
FIG. 2 is a graph showing tool removal rates for copper, graphite, and ZrB$_2$/Cu composite electrodes at different on-times.

The tool removal rates for copper, graphite, and $ZrB_2$/Cu electrodes are shown in FIG. 2 for varying on-times. This figure also shows the superior performance of the $ZrB_2$/Cu composites. At an on-time of 3.2 $\mu s$, the $ZrB_2$/Cu is 4.7 times better than copper and 3.7 times better than graphite. At an on-time of 7.5 $\mu s$, $ZrB_2$/Cu is 10 times better than copper and 4.7 times better than graphite. At an on-time of 13 $\mu s$, the $ZrB_2$/Cu is 20 times better than copper and 6 times better than graphite. Thus, at low on-times where surface finishing is performed, $ZrB_2$/Cu is a superior electrode to copper and graphite.

Figure 3:
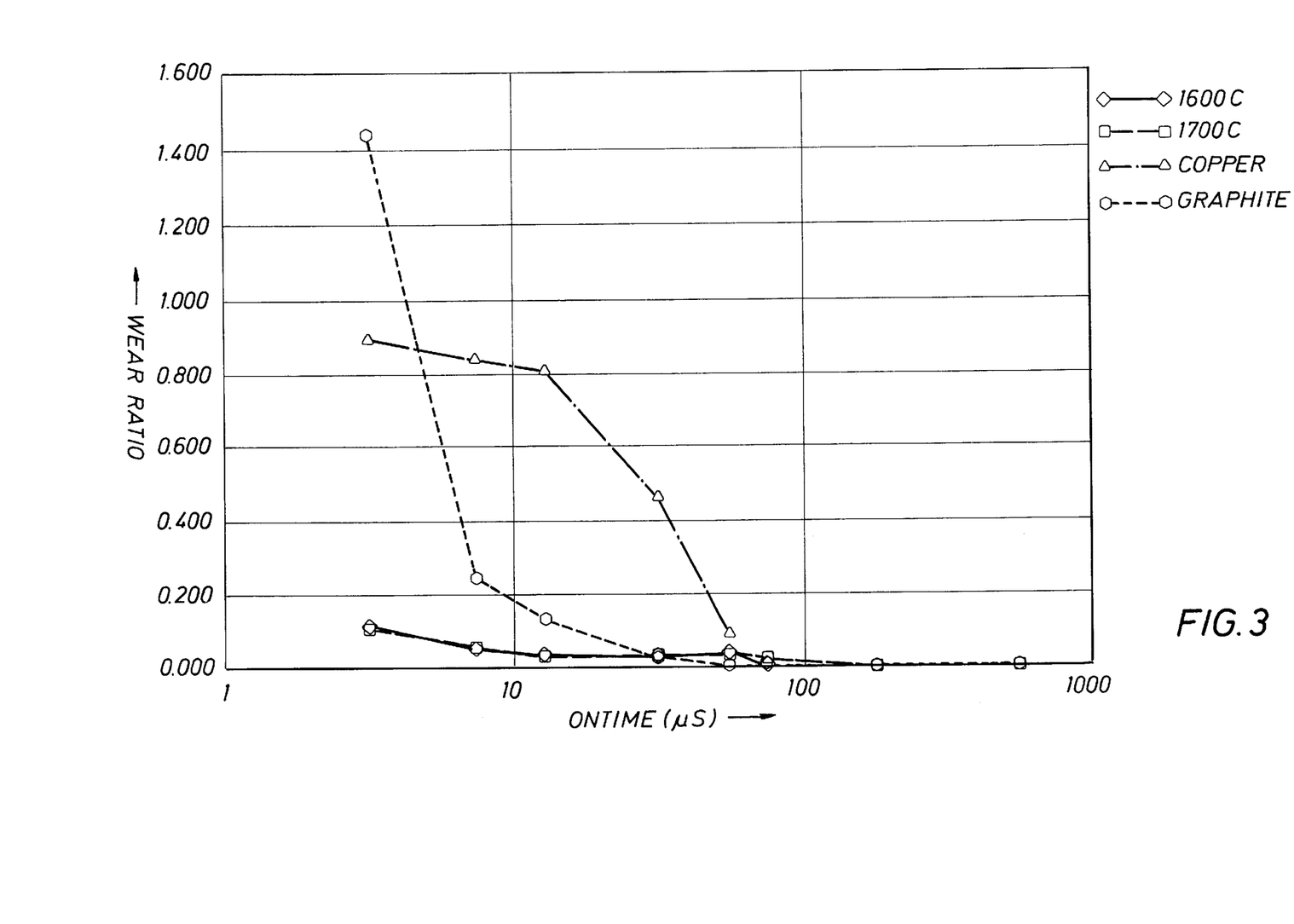
FIG. 3 is a graph showing wear ratios for copper, graphite, and ZrB$_2$/Cu composite electrodes at different on-times.

The wear ratios of copper, graphite, and $ZrB_2$/Cu for different on-times is shown in FIG. 3. Again, this demonstrates the superior performance of the $ZrB_2$/Cu composite electrode. According to the wear ratio at an on-time of 3.2 $\mu s$, $ZrB_2$/Cu is 7.8 times better than copper and 12.6 times better than graphite. At an on-time of 13 $\mu s$, $ZrB_2$/Cu is 37 times better than copper and 6 times better than graphite.

Modified versions of "rapid prototyping" are preferred where the electrode to be manufactured is of complex or varying topography or where limited numbers of electrodes are to be manufactured. "Rapid prototyping" is a known technology to facilitate rapid product development. Currently, commercial rapid prototyping techniques are generally capable of making only solids of polymer or paper. These polymer or paper solids are then used to evaluate the product or form molds for later casting. The modified versions of rapid prototyping as disclosed herein are suitable for processing or shaping $ZrB_2$ into a desired form. This is particularly advantageous for complex or varying topographies, since $ZrB_2$ is known to be difficult to machine into desired forms.

In rapid prototyping, a 3-D model produced on a computer-aided design (CAD) system is mathematically divided into a large number of thin layers, a few thousandths of an inch thick. The different processes for rapid prototyping generally work on the same basis principle, i.e., the desired part is built up in small layers, about 0.005" thick, one layer at a time, starting from the bottom and working up until the entire part is finished. Thus, the layers are built, and simultaneously consolidated to the preceding layer, using the description of that layer from the computer.

1. Selective Laser Sintering

The preferred rapid prototyping technique is "selective laser sintering" ("SLS"). SLS uses a $CO_2$ laser to sinter polymer coated powders by scanning in the horizontal plane only as dictated by a current layer description in a CAD model. The three dimensional solid is built up by the addition of material layers.

The SLS machine consists of hardware and software components. The hardware components include the process chamber and powder engine, the controls cabinet, and the atmospheric control unit. The process chamber incorporates the laser, pre-heater, and the powder handling equipment. The controls cabinet interprets the CAD drawing and controls and monitors the SLS process. The atmospheric control unit regulates the temperature and amount of $N_2$ flowing through the air in the chamber. It also filters the air that flows through the process chamber. The software components utilize the UNIX operating system and other DTM Corp. proprietary applications.

The CAD drawing is geometrically modified to horizontally divide the desired form into thin horizontal layers. These layers can be adjusted in thickness, but are typically about 0.005 in. The thin layers represent sintering planes to be traced by the $CO_2$ laser. In operation, a layer of polymer coated $ZrB_2$ is spread out. When the desired cross section of the layer is traced out by the $CO_2$ laser, the temperature of the polymer coated particles is increased, and the polymer coatings fuse together. The part is then lowered in the SLS machine by about 0.005 in., and new layers are added in a similar fashion to form the solid mass. The SLS machine builds the part one layer at a time by creating the bottom layer first, and then adding layers until the part is finished.

The polymer coated $ZrB_2$ powder was laser sintered using the DTM SINTERSTATION 2000 machine which sinters only the polymer coating and not the underlying $ZrB_2$ powder. As described below, post processing is necessary to vaporize, sublime, or "burn off" the polymer coating and sinter the $ZrB_2$ powder. After this, the sintered $ZrB_2$ powder is infiltrated with copper. This post-SLS processing generally results in a small shrinkage due to the vaporization of the polymer coating and sintering of the $ZrB_2$ powder. By holding the processing variables constant, this shrinkage may be compensated for in the CAD design of the electrode, i.e., the CAD design provides for a slightly larger $ZrB_2$/polymer shaped form, such that upon shrinkage, the $ZrB_2$/Cu composite electrode will be the desired size.

Generally, for SLS shaping of the $ZrB_2$/polymer to the desired form, the polymer coated powder preferably has a particle size greater than 10 $\mu$m because the powder in the SLS machine is moved by a counter-rotating roller, and this method of powder transfer does not work well for finer powders.

The $CO_2$ laser used in the SLS machine is generally only capable of producing enough heat to fuse low-melting polymers such as nylon or polycarbonate; as such, it is these and similar low-melting point polymers which are used to coat the $ZrB_2$ powder when the SLS process is employed. Additionally, the polymer or copolymer used must suitably vaporize or sublime in the vaporization step prior to sintering the $ZrB_2$ powder. A suitable polymer coated $ZrB_2$ powder is available from DTM Corp. (Austin, Tex.).

2. Laminated Object Manufacturing

Laminated Object Manufacturing ("LOM") is a rapid prototyping technique wherein tapes of polymer coated $ZrB_2$ powder are cut and stacked to shape $ZrB_2$ into a desired form. Such an LOM technique is offered by Helisys Co. (Torrance, Calif.) and by ART (Buffalo, N.Y.).

3. 3-D Printing

There are two general methods which utilize 3-D printing to shape $ZrB_2$ into a desired form. In a first method of 3-D printing, a layer of $ZrB_2$ powder, without a polymer coating as discussed above, is sprayed with polymer from a spray jet similar to an ink jet printer spray jet. The spraying is computer controlled and based upon the CAD drawing, similar to that discussed above. The spraying of the polymer binds only the powder in that layer which comes in contact with the polymer. Then, another layer of $ZrB_2$ powder is laid out, the sprayer sprays polymer on the appropriate sections, and the desired form is built up in the layer by layer manufacturing technique.

In a second method of 3-D printing, a slurry of polymer and $ZrB_2$ powder is made up such that it has suitable flow characteristics such that it can be sprayed from a spray jet similar to an inkjet printer spray jet. The spraying of the slurry is computer controlled based upon the CAD drawing and the desired form is built up layer by layer.

These 3-D printing techniques are offered by MIT's Dept. of Mechanical Engineering and Dept. of Material Science and Engineering.

4. Fused Deposition Modeling ("FDM")

FDM employs a thermoplastic polymer and $ZrB_2$ combined in a formed wire. This polymer and $ZrB_2$ wire is fed through a nozzle which heats and extrudes the polymer and $ZrB_2$ into a thin layer. The thin layers are built up, layer by layer, to shape the polymer and $ZrB_2$ into a desired form. FDM is generally less preferred than the above noted manufacturing techniques. However, a suitable FDM technique is offered by Stratasys (Eden Prairie, Minn.).

Following each of the above rapid prototyping or cold pressing shaping methods, the $ZrB_2$/polymer may further be shaped, e.g., by machining or grinding. Generally, for this to be done, a high $T_g$ polymer must be used or the machining or grinding step must be done in a cooled environment.

C. Sintering the Shaped $ZrB_2$/Polymer

After the polymer coated $ZrB_2$ powder is shaped to the desired form, the desired form is sintered to vaporize or sublime the polymer coating and to sinter the $ZrB_2$ powder. The vaporization step may be referred to by those skilled in the art as "burn-out"; however, this terminology is somewhat misleading in that it is preferred that substantially no oxygen be present during the sintering step. As discussed below, oxygen present in the sintering step may lead to reduced wetting in the copper infiltration step or oxidation of the $ZrB_2$. The vaporization step is accomplished by heating the desired form to a temperature of about 600° C. and holding that temperature for about 20 minutes. Then, the $ZrB_2$ sintering step is accomplished by heating the sintering furnace containing the desired form to about 1600° C. to about 1700° C. and holding that temperature for about two hours. Following the sintering step, the sintered $ZrB_2$ powder shaped form is allowed to cool.

In the sintering step, it is preferred that the polymer which coats the $ZrB_2$ powder vaporizes, and does not melt, as melting would lead to a degradation of the shape of the desired form.

The sintering step produces a sintered shaped form which is about 30 vol. % to about 70 vol. % occupied by sintered $ZrB_2$, i.e., about 30% to about 70% dense. The density may advantageously be varied depending upon the desired application, e.g., to minimize electrode wear rate in a particular application. The density or porosity may be altered by varying the size or size distribution of the $ZrB_2$ powder particles used, varying the polymer coating thickness, varying the manufacturing technique, etc. The density or porosity determines the $ZrB_2$-copper ratio and may be optimized to meet specific objectives.

It is preferred that the sintering step be substantially oxygen free, because, if oxygen is present, the $ZrB_2$ may oxidize to $ZrO_2$ and $B_2O_3$. $B_2O_3$ is gaseous and would be removed in the sintering process.

Following the sintering step, regardless of whether rapid prototyping or cold pressing was employed, the sintered $ZrB_2$ may be shaped to a second desired form, e.g., by machining or grinding. This may be done if certain dimensions need to be very accurate or even for general shaping of sintered $ZrB_2$ into a second desired form.

D. Infiltrating Sintered $ZrB_2$ with Copper

Tests indicated that $ZrB_2$ may not easily be wetted by pure copper or that perhaps there is an oxide coating on the $ZrB_2$ or carbon or ash contamination of the $ZrB_2$, perhaps formed during vaporization of the polymer coating or sintering of the $ZrB_2$, as discussed above. Thus, while pure copper is preferred due to its thermal and electrical conductivity if suitable wetting can be achieved, copper alloys have been developed to make wetting more thermodynamically favorable. In particular, it has been found that copper which is alloyed with suitable amounts of boron or nickel, e.g., up to about 3 wt. % boron or up to about 10 wt. % nickel, provides for suitably wetting the $ZrB_2$. Additionally, this wetting problem may be solved by providing a suitably inert atmosphere in the sintering furnace. It should be noted that this copper alloying reduces the thermal and electrical conductivity of the copper infiltrant, which may in turn reduce the electrode's resistance to erosion. Thus, attempts should be made to prevent significant reductions of the thermal and electrical conductivity of the copper infiltrant by, e.g., only using the minimum amount of boron or nickel which provides suitable wetting.

The infiltration is accomplished by placing powder or small chunks of pure copper or the copper alloy discussed above on one side of the shaped $ZrB_2$ form, placing this in a furnace and heating above the melting point of the copper (1084° C.) or the copper alloy, such that by capillary action, the copper or copper alloy is infiltrated into the open area of the shaped $ZrB_2$ form to produce the $ZrB_2$/copper composite in the desired form with an about 100% density. It has been found less preferable to place the copper or copper alloy around the shaped $ZrB_2$ form, as this causes lines of imperfection within the composite caused by capillary fronts from more than one direction.

Another, but less preferred method of infiltrating the shaped $ZrB_2$ form is by vapor deposition of copper or a copper alloy. Generally, vapor deposition is less preferred as it does not completely fill the open areas as does the above noted capillary action. However, vapor deposition may alleviate the wetting problem discussed above, thus allowing pure copper or a purer copper alloy to wet the shaped $ZrB_2$ form.

II. Uses for $ZrB_2$/Cu Electrodes

The preferred uses for the $ZrB_2$/Cu composite electrode of the present invention are listed below. These uses currently utilize copper, graphite, or similar electrodes and have electrode erosion, such that the electrode must be replaced, preventing prolonged, continuous use.

A significant advantage of the present invention is that $ZrB_2$/Cu composite electrodes have minimum electrode wear rates. The $ZrB_2$/Cu composite electrodes of the present inventions are suitable for replacing currently used copper, graphite, or similar electrodes. This replacement will occur most frequently where the currently used electrode has electrode wear or erosion and must be replaced. The applications which have electrode erosion where $ZrB_2$/Cu composite electrodes are preferred to be utilized include:

A. Electrical Discharge Machining

A particularly preferred use of the $ZrB_2$/Cu composite electrodes of the present invention is for electrodes in electrical discharge machining (EDM). EDM allows the "machining" of materials, such as tool steels, which are otherwise too hard to machine using traditional machining methods. EDM is an electrical erosion process where the electrode and workpiece (typically the anode and cathode, respectively) are separated by a liquid dielectric. A voltage is applied to the gap of approximately 40 $\mu$m between the electrode and the workpiece. This energy transfer causes the electrode and the workpiece to be eroded. The time the current flows between the electrode and the workpiece is termed the on-time. This on-time is followed by an appropriate off-time, where the current drops to zero and the dielectric is allowed to "flush" out eroded material. These on-times and off-times for die-sinking EDM machines are generally on the order of 10 $\mu$s to 200 $\mu$s.

However, the use of an electrode as an EDM electrode requires that the electrode be suitably formed with dimensional accuracy and surface quality. Generally, any material with less than 1 ohm-m of electrical resistivity, regardless of hardness, can be machined using EDM. EDM also allows the convenient production of complex shapes in the tool cavity, as complex topographies can often be more easily formed on the electrode than inside a cavity. Even certain simple shapes such as rectangular or square cavities are often easier to produce using EDM than conventional machining.

The most common, currently used electrode materials for EDM are graphite and copper. These materials have a combination of electrical and thermal properties which makes them well suited for EDM electrodes. Additionally, these materials are relatively easy to machine to a desired form. Even with these advantages, however, EDM machining is precluded from many market niches by the relatively high cost of current electrode production. The cost of current electrode fabrication is generally greater than 50%, and sometimes as great as 80%, of the total cost of fabricating a die using EDM. In EDM, the high wear rate of graphite and copper electrodes requires the use of multiple electrodes in the production of each cavity because the electrode is worn away and loses its initial shape too quickly. Thus, the replacement of graphite and copper electrodes with the inventive $ZrB_2$/Cu composite electrodes, which are more wear resistant, significantly improves the cost effectiveness of EDM tool production.

Furthermore, many molds or other tools having multiple cavities, manufactured with current EDM machining techniques, use a different electrode for each separate cavity because it is more cost effective and easier to machine several small, simply-shaped electrodes than it is to machine one large, complex electrode. This requires a greater total sink time in the EDM machine, since multiple electrodes are used sequentially rather than simultaneously.

For EDM electrodes, several variables are used to measure performance. The most important variables are (1) wear ratio [(wear rate of electrode)÷(wear rate of workpiece)]; (2) volumetric removal rate of the workpiece (sink rate); (3) dimensional accuracy of the cavity produced; and (4) surface finish of the cavity produced. The first two variables relate to the efficiency of the EDM process. Here, the wear ratio is an important variable as this determines how often the electrode must be removed and replaced. The volumetric removal rate is a measure of the speed of producing a cavity in the workpiece. The last two variables relate to the quality of the product produced by the EDM process. Tools and dies produced by EDM for metal stamping and forging are often required to have dimensional accuracy, while dies produced by EDM for injection molding usually need a higher quality surface finish on the cavity produced.

Generally, the surface finish of the workpiece is directly proportional to the on-time. At low on-times, a higher surface quality finishing is obtained. At higher on-times, a rougher workpiece surface finish is obtained.

EDM has the significant advantage of allowing a tool part to be heat treated to its full hardness before a cavity is produced therein, which eliminates the need for heat treating after milling. Thus, there will be no distortion in the final part due to the heat treatment. Also, the EDM process imparts minimal work hardening or mechanical stresses since there is no contact between the workpiece and the tool. Further, EDM offers higher dimensional accuracy and ease of production of complex shapes in the tool cavity compared to conventional machining.

A particular advantage of the present invention is the use of SLS to produce an EDM electrode. SLS provides the advantage of allowing the production of complex shaped EDM electrodes. Thus, with the low wear rate of $ZrB_2$/Cu composite electrodes and the ability to make complex shapes, one complex shaped $ZrB_2$/Cu composite electrode can replace several currently used EDM copper electrodes, leading to a quicker and less expensive tool and die manufacture.

EXAMPLE 2

Anodes of (1) copper, (2) graphite, and (3) $ZrB_2/Cu$ were measured for spark erosion when machining steel in an AGIETRON 1U EDM die-sinking machine. The machine operating conditions were the same for the three different electrodes: current of 63 amperes; pulse time at 18 $\mu s$; pause time at 320 $\mu s$. These conditions, i.e., high current and short pulse time, were chosen for this test, as, generally, these conditions provide unusually high electrode erosion rates. The results in Table 1 show that the graphite electrode wear ratio of 0.150 is 4.3 times more than the $ZrB_2/Cu$ electrode wear ratio of 0.0346. Table 1 further shows that the copper electrode is worn down 16.6 times more than the $ZrB_2/Cu$ electrode at these conditions.

TABLE 1

|  | ELECTRODE | | |
| --- | --- | --- | --- |
|  | Copper | Graphite | $ZrB_2/Cu$ |
| Erosion Rate of Steel ($mm^3$/min) | 3.40 | 4.84 | 3.12 |
| Erosion Rate of Electrode ($mm^3$/min) | 1.97 | 0.717 | 0.108 |
| Wear Ratio (electrode/workpiece) | 0.58 | 0.15 | 0.035 |

Thus, $ZrB_2/Cu$ electrodes provide a rapid sink rate with electrode wear ratios significantly less than copper or graphite.

B. Aluminum Recycling

In aluminum recycling, an electric arc is struck from an electrode to molten aluminum in a ladle. Purified aluminum is then separated from slag which contains paint and other impurities from the recycled aluminum cans. Generally, electrodes are consumed in the process at a rate such that three parallel production units are commonly used, two operating with the third shutdown for electrode replacement.

C. Spot Welding

In spot welding, electrodes are consumed and must be replaced periodically. In some cases, contamination of the weld with the eroded electrode material is a problem. This would be eliminated or, at least, substantially reduced with the $ZrB_2/Cu$ composite electrodes of the present invention.

D. Arc Jet Plasma Reactors

Arc jet plasma reactors are used for a variety of applications. Current reactors can presently be operated for only about 10–30 hours before the current copper anode (an orifice) is eroded through, causing disintegration of the anode with small parts of the copper violently ejected out the reactor exhaust. The $ZrB_2/Cu$ composite electrode of the present invention would allow longer anode life while also reducing this safety hazard.

E. Nuclear and Municipal Waste or Trash Remediation

New waste remediation plants are operating in Norway and France which use plasma arc devices for waste remediation. Current operation is continuous except for a daily shutdown of 1–2 hours for electrode replacement. Use of the $ZrB_2/Cu$ composite electrodes of the present invention would allow longer run time before shut down for electrode replacement.

F. Rail Guns

Used mostly for military applications, arc-driven rail guns are used to accelerate massive projectiles to high velocities.

G. High-Current Switches for Pulsed Powder

There are many applications involving electrical switches where erosion of the switch electrodes is a problem. High powered switches exhibit a temporary arc when opened or closed. Frequent opening and closing, as in pulsed power supplies, can lead to electrode erosion and failure.

H. High-Power Ion Thrusters

Ion beam sources have been developed for space propulsion as well as ion machining and sputter coating applications.

I. Microelectronics Processing

Plasmas are currently used in about 30% of all microelectronics processing operations. Here, electrode erosion is often a problem due to contamination of the wafers.

J. Plasma Spray Coating

Plasma spray coating is best known for the spraying of aircraft surfaces with titanium. Currently, the electrodes last about 30 hours and then must be replaced by disassembling the plasma gun.

The $ZrB_2$ formed by the process of the present invention has excellent material properties such as high wear and abrasion resistance, extreme hardness, high melting point, and good thermal and electrical conductivity. The addition of copper to the $ZrB_2$ matrix to produce the $ZrB_2/Cu$ composite has a synergistic effect, providing a material far superior to either $ZrB_2$ or copper. The $ZrB_2/Cu$ composite has an electrical conductivity near copper with much higher wear and abrasion resistance than copper, making it an excellent material for electrodes, particularly for electrodes where minimum electrode wear rates are advantageous. If the $ZrB_2$ was used alone as an electrode, mechanical failure of the electrode would occur, without melting, but by the overcoming of the bond strength with thermal stresses alone. This is called "thermal spalling", and it occurs as the $ZrB_2$ expands and contracts during sudden temperature changes at the surface of the electrode during erosion. When copper is used by itself, it erodes by melting. When the $ZrB_2$ is combined with copper, the combination allows for the copper to melt and resolidify to the higher-melting point $ZrB_2$ material, and the excess heat is carried away from the surface quickly because of the high thermal conductivity of the copper. The copper also aids in reducing the effects of thermal spalling because it is not brittle and it helps reduce the internal stresses that cause spalling.

The $ZrB_2/Cu$ composite electrodes of the present invention provide the following advantages: (1) improved wear resistance over known copper and graphite electrodes; (2) improved sink rate over known copper and graphite electrodes; (3) control of dimensional accuracy on an EDM workpiece; and (4) an improved surface finish on an EDM workpiece.

The present invention solves the problems mentioned above by providing $ZrB_2/Cu$ composite electrodes, and particularly EDM electrodes, which may be time and cost efficiently manufactured and which provide sufficient dimensional accuracy and surface quality such that the $ZrB_2/Cu$ composite electrode may be used as an EDM electrode.

Although the present invention has been described in detail, it should be understood that various changes, alterations, and substitutions may be made to the teachings herein without departing from the spirit and scope of the present invention as defined by the appended claims.

We claim:

1. An electrode produced by a process comprising the steps of:

shaping $ZrB_2$ powder into a desired form by a method selected from the group of shaping methods consisting of selective laser sintering, laminated object manufacturing, 3-D printing, fused deposition modeling and cold pressing;

sintering the shaped $ZrB_2$ powder; and contacting the $ZrB_2$ powder with Cu and heating the sintered $ZrB_2$ and Cu above the melting point of Cu to infiltrate the $ZrB_2$ with Cu to form a $ZrB_2$/Cu composite electrode.

2. The electrode of claim 1, wherein the shaping step further comprises contacting the $ZrB_2$ powder with a polymer and utilizing the polymer to hold the $ZrB_2$ powder in the desired form;

and further comprising the step of vaporizing the polymer prior to sintering the shaped $ZrB_2$ powder.

3. The electrode of claim 1, wherein the polymer is vaporized at a temperature of about 350° C. to about 700° C.

4. The electrode of claim 1, wherein the sintering step produces a sintered shaped form which is about 30 vol. % to about 70 vol. % occupied by sintered $ZrB_2$.

5. The electrode of claim 1, wherein the sintering step comprises heating the desired form from about 1300° C. to about 1900° C.

6. The electrode of claim 1, wherein the contacting the sintered $ZrB_2$ with Cu step comprises the Cu being alloyed with a suitable amount of boron for the Cu alloy to suitably wet the sintered $ZrB_2$.

7. The electrode of claim 6, wherein the amount of boron is up to about 3 wt. % boron.

8. The electrode of claim 1, wherein the contacting the sintered $ZrB_2$ with Cu step comprises the Cu being alloyed with a suitable amount of nickel for the Cu alloy to suitably wet the sintered $ZrB_2$.

9. The electrode of claim 8, wherein the amount of nickel is up to about 10 wt. % nickel.

10. The electrode of claim 1, wherein the $ZrB_2$/Cu composite electrode has a wear rate less than a copper electrode or a graphite electrode in a similar service.

11. The electrode of claim 1, wherein, after the step of sintering the shaped $ZrB_2$ powder, the process further comprising the step of shaping the sintered $ZrB_2$ to a second desired form.

12. A method for producing an electrode, comprising the steps of:

shaping $ZrB_2$ powder into a desired form by a method selected from the group of shaping methods consisting of selective laser sintering, laminated object manufacturing, 3-D printing, fused deposition modeling and cold pressing;

sintering the shaped $ZrB_2$ powder; and contacting the $ZrB_2$ powder with Cu and heating the sintered $ZrB_2$ and Cu above the melting point of Cu to infiltrate the $ZrB_2$ with Cu to form a $ZrB_2$/Cu composite electrode.

13. The method of claim 12, wherein the shaping step further comprises contacting the $ZrB_2$ powder with a polymer and utilizing the polymer to hold the $ZrB_2$ powder in the desired form;

and further comprising the step of vaporizing the polymer prior to sintering the shaped $ZrB_2$ powder.

14. The method of claim 13, wherein the polymer is vaporized at a temperature of about 350° C. to about 700° C.

15. The method of claim 12, wherein the sintering step produces a sintered shaped form which is about 30 vol. % to about 70 vol. % occupied by sintered $ZrB_2$.

16. The method of claim 12, wherein the sintering step comprises heating the desired form from about 1300° C. to about 1900° C.

17. The method of claim 12, wherein the contacting the sintered $ZrB_2$ with Cu step comprises the Cu being alloyed with a suitable amount of boron for the Cu alloy to suitably wet the sintered $ZrB_2$.

18. The method of claim 17, wherein the amount of boron is up to about 3 wt. % boron.

19. The method of claim 12, wherein the contacting the sintered $ZrB_2$ with Cu step comprises the Cu being alloyed with a suitable amount of nickel for the Cu alloy to suitably wet the sintered $ZrB_2$.

20. The method of claim 19, wherein the amount of nickel is up to about 10 wt. % nickel.

21. The method of claim 12, wherein the $ZrB_2$/Cu composite electrode has a wear rate less than a copper electrode or a graphite electrode in a similar service.

22. The method of claim 12, wherein, after the step of sintering the shaped $ZrB_2$ powder, the process further comprising the step of shaping the sintered $ZrB_2$ to a second desired form.

23. In a process utilizing an electrode in an application in which the electrode erodes, the improvement comprising utilizing a $ZrB_2$ composite electrode, the electrode being produced by a process comprising the steps of shaping $ZrB_2$ powder into a desired form by a method selected from the group of shaping methods consisting of selective laser sintering, laminated object manufacturing, 3-D printing, fused deposition modeling and cold pressing, sintering the shaped $ZrB_2$ powder, and contacting the $ZrB_2$ powder with Cu and heating the sintered $ZrB_2$ and Cu above the melting point of Cu to infiltrate the $ZrB_2$ with Cu to form a $ZrB_2$/Cu composite electrode.

24. The process of claim 23, wherein the process utilizing an electrode in an application in which the electrode has erosion is selected from the group comprising electrical discharge machining, aluminum recycling, spot welding, arc jet plasma reactors, waste remediation, rail guns, high-current switches for pulsed power supplies, high-power ion thrusters, microelectronics processing, and plasma spray coating.

25. The process of claim 23, wherein the shaping step further comprises contacting the $ZrB_2$ powder with a polymer and utilizing the polymer to hold the $ZrB_2$ powder in the desired form;

and further comprising the step of vaporizing the polymer prior to sintering the shaped $ZrB_2$ powder.

26. The process of claim 25, wherein the polymer is vaporized at a temperature of about 350° C. to about 700° C.

27. The process of claim 23, wherein the sintering step produces a sintered shaped form which is about 30 vol. % to about 70 vol. % occupied by sintered $ZrB_2$.

28. The process of claim 23, wherein the sintering step comprises heating the desired form from about 1300° C. to about 1900° C.

29. The process of claim 23, wherein the contacting the sintered $ZrB_2$ with Cu step comprises the Cu being alloyed with a suitable amount of boron for the Cu alloy to suitably wet the sintered $ZrB_2$.

30. The process of claim 29, wherein the amount of boron is up to about 3 wt. % boron.

31. The process of claim 23, wherein the contacting the sintered $ZrB_2$ with Cu step comprises the Cu being alloyed with a suitable amount of nickel for the Cu alloy to suitably wet the sintered $ZrB_2$.

32. The process of claim 31, wherein the amount of nickel is up to about 10 wt. % nickel.

33. The process of claim 23, wherein the $ZrB_2$/Cu composite electrode has a wear rate less than a copper electrode or a graphite electrode in a similar service.

34. The process of claim 23, wherein after the step of sintering the shaped $ZrB_2$ powder, the process further comprising the step of shaping the sintered $ZrB_2$ to a second desired form.

35. An electrode produced by a process comprising:

obtaining $ZrB_2$ powder substantially coated with a polymer;

utilizing selective laser sintering to shape the polymer coated $ZrB_2$ powder into a desired form;

vaporizing the polymer from the desired form;

after the vaporizing step, sintering the $ZrB_2$ powder in the desired form;

contacting the sintered $ZrB_2$ with Cu and heating the sintered $ZrB_2$ and Cu above the melting point of Cu to infiltrate the $ZrB_2$ with Cu to form a $ZrB_2$/Cu composite electrode.

36. The electrode of claim 35, wherein the polymer is vaporized at a temperature of about 350° C. to about 700° C.

37. The electrode of claim 35, wherein the sintering step produces a sintered shaped form which is about 30 vol. % to about 70 vol. % occupied by sintered $ZrB_2$.

38. The electrode of claim 35, wherein the sintering step comprises heating the desired form from about 1300° C. to about 1900° C.

39. The electrode of claim 35, wherein the contacting the sintered $ZrB_2$ with Cu step comprises the Cu being alloyed with a suitable amount of boron for the Cu alloy to suitably wet the sintered $ZrB_2$.

40. The electrode of claim 39, wherein the amount of boron is up to about 3 wt. % boron.

41. The electrode of claim 35, wherein the contacting the sintered $ZrB_2$ with Cu step comprises the Cu being alloyed with a suitable amount of nickel for the Cu alloy to suitably wet the sintered $ZrB_2$.

42. The electrode of claim 41, wherein the amount of nickel is up to about 10 wt. % nickel.

43. The electrode of claim 35, wherein the $ZrB_2$/Cu composite electrode has a wear rate less than a copper electrode or a graphite electrode in a similar service.

44. The electrode of claim 35, wherein, after the step of sintering the $ZrB_2$ powder, the process further comprising the step of shaping the sintered $ZrB_2$ to a second desired form.

45. An electrode produced by a process comprising:

shaping $ZrB_2$ powder into a desired form;

sintering the shaped $ZrB_2$ powder;

utilizing copper vapor deposition to at least partially infiltrate the sintered $ZrB_2$ with Cu to form a $ZrB_2$/Cu composite electrode.

46. The electrode of claim 45, wherein shaping $ZrB_2$ powder into a desired form comprises a method selected from the group comprising selective laser sintering, laminated object manufacturing, 3-D printing, fused deposition modeling, and cold pressing.

47. The electrode of claim 45, wherein the shaping step further comprises contacting the $ZrB_2$ powder with a polymer and utilizing the polymer to hold the $ZrB_2$ powder in the desired form;

and further comprising the step of vaporizing the polymer prior to sintering the shaped $ZrB_2$ powder.

48. The electrode of claim 47, wherein the polymer is vaporized at a temperature of about 350° C. to about 700°C.

49. The electrode of claim 45, wherein the sintering step produces a sintered shaped form which is about 30 vol. % to about 70 vol. % occupied by sintered $ZrB_2$.

50. The electrode of claim 45, wherein the sintering step comprises heating the desired form from about 1300° C. to about 1900° C.

51. The electrode of claim 45, wherein the $ZrB_2$/Cu composite electrode has a wear rate less than a copper electrode or a graphite electrode in a similar service.

52. The electrode of claim 45, wherein, after the step of sintering the shaped $ZrB_2$ powder, the process further comprising the step of shaping the sintered $ZrB_2$ to a second desired form.

53. A method for producing a composite article, comprising the steps of:

shaping $ZrB_2$ powder into a desired form by a method selected from the group of shaping methods consisting of selective laser sintering, laminated object manufacturing, 3-D printing, fused deposition modeling and cold pressing;

sintering the shaped $ZrB_2$ powder; and contacting the $ZrB_2$ powder with Cu and heating the sintered $ZrB_2$ and Cu above the melting point of Cu to infiltrate the $ZrB_2$ with Cu to form a $ZrB_2$/Cu composite article.

54. The method of claim 53, wherein the shaping step further comprises contacting the $ZrB_2$ powder with a polymer and utilizing the polymer to hold the $ZrB_2$ powder in the desired form;

and further comprising the step of vaporizing the polymer prior to sintering the shaped $ZrB_2$ powder.

55. The method of claim 54, wherein the polymer is vaporized at a temperature of about 350° C. to about 700° C.

56. The method of claim 53, wherein the sintering step produces a sintered shaped form which is about 30 vol. % to about 70 vol. % occupied by sintered $ZrB_2$.

57. The method of claim 53, wherein the sintering step comprises heating the desired form from about 1300° C. to about 1900° C.

58. The method of claim 53, wherein the contacting the sintered $ZrB_2$ with Cu step comprises the Cu being alloyed with a suitable amount of boron for the Cu alloy to suitably wet the sintered $ZrB_2$.

59. The method of claim 53, wherein the amount of boron is up to about 3 wt. % boron.

60. The method of claim 53, wherein the contacting the sintered $ZrB_2$ with Cu step comprises the Cu being alloyed with a suitable amount of nickel for the Cu alloy to suitably wet the sintered $ZrB_2$.

61. The method of claim 53, wherein the amount of nickel is up to about 10 wt. % nickel.

62. The method of claim 53, wherein, after the step of sintering the shaped $ZrB_2$ powder, the process further comprising the step of shaping the sintered $ZrB_2$ to a second desired form.

63. The method of claim 53, further comprising the step of contacting the shaped $ZrB_2$ powder with a mixture of hydrogen and at least one inert gas.

64. The method of claim 53, further comprising the step of acid washing the shaped $ZrB_2$ powder.

65. The method of claim 64, wherein the step of acid washing the shaped $ZrB_2$ powder comprises contacting the shaped $ZrB_2$ powder with an acid selected from the group consisting of hydrofluoric acid, boric acid, or mixtures thereof.

* * * * *